(12) United States Patent
Alten

(10) Patent No.: US 9,742,865 B2
(45) Date of Patent: Aug. 22, 2017

(54) SYSTEMS AND METHODS FOR MANAGING SHARED CONTENT BASED ON SHARING PROFILES

(71) Applicant: Dropbox, Inc., San Francisco, CA (US)

(72) Inventor: Brett Alten, Cupertino, CA (US)

(73) Assignee: Dropbox, Inc., San Francisco, CA (US)

(*) Notice: Subject to any disclaimer, the term of this patent is extended or adjusted under 35 U.S.C. 154(b) by 0 days.

(21) Appl. No.: 15/019,624

(22) Filed: Feb. 9, 2016

(65) Prior Publication Data

US 2016/0203150 A1 Jul. 14, 2016

Related U.S. Application Data

(62) Division of application No. 14/097,199, filed on Dec. 4, 2013, now Pat. No. 9,288,283.

(51) Int. Cl.
*G06F 17/30* (2006.01)
*H04L 29/08* (2006.01)
*H04L 29/06* (2006.01)

(52) U.S. Cl.
CPC ...... *H04L 67/306* (2013.01); *G06F 17/30115* (2013.01); *G06F 17/30424* (2013.01); *G06F 17/30454* (2013.01); *G06F 17/30498* (2013.01); *G06F 17/30867* (2013.01); *H04L 67/1095* (2013.01); *H04L 67/22* (2013.01); *H04L 67/42* (2013.01)

(58) Field of Classification Search
CPC .............................. H04L 67/306; G06F 3/0482
USPC ........ 709/205, 206, 207, 248; 707/610, 634, 707/776
See application file for complete search history.

(56) References Cited

U.S. PATENT DOCUMENTS

| | | | |
|---|---|---|---|
| 7,734,690 B2 | 6/2010 | Moromisato et al. | |
| 8,271,535 B2 | 9/2012 | Ring et al. | |
| 8,775,391 B2 | 7/2014 | Kalavade | |
| 9,069,444 B1* | 6/2015 | Hansen | G06F 17/30174 |
| 9,235,268 B2 | 1/2016 | Arrasvuori et al. | |
| 2005/0091316 A1* | 4/2005 | Ponce | H04L 63/104 709/205 |
| 2007/0112762 A1 | 5/2007 | Brubaker | |
| 2009/0187486 A1 | 7/2009 | Lefenfeld et al. | |
| 2010/0262582 A1* | 10/2010 | Garcia-Ascanio | G06F 17/30174 707/634 |
| 2011/0078129 A1 | 3/2011 | Chunilal | |
| 2011/0307695 A1 | 12/2011 | Slater | |

(Continued)

OTHER PUBLICATIONS

"Using Reconciliation to Share Files between Occasionally Connected Computers"—John H. Howard, Mitsubishi Electric Research Laboratories, Dec. 1996 http://www.merl.com/publications/docs/TR93-08a.pdf.*

(Continued)

*Primary Examiner* — Randy Scott
(74) *Attorney, Agent, or Firm* — Polsinelli PC

(57) ABSTRACT

Content items stored in an online content management service can be organized and shared. Content items can be associated with sharing profiles that include various sharing-specific metadata, such as details of how an item is shared or with whom it is shared. In some embodiments, the metadata stored in the sharing profiles can be used to organize shared content into shared folders automatically and/or to sort a list of content items.

18 Claims, 16 Drawing Sheets

(56) References Cited

U.S. PATENT DOCUMENTS

| | | | |
|---|---|---|---|
| 2013/0246901 A1* | 9/2013 | Massand | G06F 17/24 715/229 |
| 2013/0332987 A1 | 12/2013 | Tenneti et al. | |
| 2014/0258350 A1* | 9/2014 | Duval | G06F 17/30174 707/829 |
| 2014/0365432 A1* | 12/2014 | Jain | G06F 17/30194 707/610 |
| 2015/0156274 A1 | 6/2015 | Alten | |
| 2015/0169566 A1 | 6/2015 | Yang | |

OTHER PUBLICATIONS

Philippe Golle et al., "Incentives for Sharing in Peer-to-Peer Networks", Stanford University, Dec. 2011, https://crypto.stanford.edu/~pgolle/papers/peer.pdf.

* cited by examiner

| | |
|---|---|
| SHARING FIELDS | |
| SHARING STATUS | Shared/Not Shared |
| SHARING TYPE | Link/Folder/Direct |
| SHARING TARGET | User and/or Group Identifiers |
| RESTRICTION FIELDS | |
| TEMPORAL | Time Period/Date and Time |
| GEOGRAPHIC | Region/Country/State |
| DOWNLOAD | Count |

FIG. 3

SYSTEMS AND METHODS FOR MANAGING SHARED CONTENT BASED ON SHARING PROFILES

CROSS-REFERENCE TO RELATED APPLICATIONS

This application is a divisional of U.S. application Ser. No. 14/097,199, filed Dec. 4, 2013, entitled, "SYSTEMS AND METHODS FOR MANAGING SHARED CONTENT BASED ON SHARING PROFILES", which is incorporated by reference herein in its entirety.

BACKGROUND

This disclosure relates generally to online content management services and in particular to managing sharing content stored in an online content management service based on sharing profiles associated with the content.

Online content management services allow users to access and manage content across multiple devices using the Internet. Online content management services typically also enable users to share content with other persons, both members and non-members of the online content management services. In a typical online content management service, a user establishes an account with the service provider and associates various content items with the account. For example, some online content management services can allow the user to store content items (including but not limited to text documents; email messages; text messages; other types of messages; media files such as photos, videos, and audio files; and/or folders containing multiple files) and to selectively allow other users to access the content items. Content items can be stored in a repository maintained by the service provider and mirrored to or synchronized with local copies on various user devices.

As more content items are stored in and shared through online content management services, management of sharing permissions as well as organization and navigation of content items becomes an increasingly complex task.

SUMMARY

Certain embodiments of the present invention relate to organizing content items stored in an online content management service based on sharing profiles associated with the content items (including but not limited to text documents; email messages; text messages; other types of messages; media files such as photos, videos, and audio files; and/or folders containing multiple files). Each sharing profile includes content item-specific metadata, such as identifiers for who the content item is shared with, and any sharing restrictions that are associated with the sharing profile. Using the metadata stored in the sharing profiles, a content management service can enable the user to selectively view shared content items and sort the content items based on the metadata in the sharing profiles. Content items can be shared through the online content management service to other users and/or groups. Sharing can be effected by creating a shareable link for a content item, creating a shared folder, or directly sharing a document.

In some embodiments a sharing summary for a content item can be displayed using metadata stored in its sharing profile. A user can make changes to the sharing summary and those changes can be dynamically reflected in the sharing profile. The online content management service can automatically organize content items into shared folders based on who the content items are shared with. A user can manually organize shared items by joining content items, such as by adding a content item to a folder or dragging two documents together in a user interface. When content items are joined, the sharing profiles associated with the joined content items can be updated to reflect the users and/or groups with which the joined content items are shared.

Using the metadata stored in each sharing profile, content items can be simply and intuitively sorted by the user. This enables the user to keep track of, and make changes to, how each content item is shared efficiently, without requiring the user to navigate to each content item stored in the online content management service, determine how the content item is shared and then decide whether to change how the content item is shared. This reduces processing load at the online content management service. In some embodiments, copies of sharing profiles can be returned to the user's client device. Using the sharing profiles, the client device can sort and re-sort the content items as directed by the user, without further input from the online content management service. This further reduces the processing requirements of the online content management service and improves the scalability of the online content management service to by taking advantage of the processing resources of client devices.

The following detailed description together with the accompanying drawings will provide a better understanding of the nature and advantages of the present invention.

BRIEF DESCRIPTION OF THE DRAWINGS

FIG. 3 shows a sharing profile, in accordance with an embodiment of the present invention.

DETAILED DESCRIPTION

Figure 1:
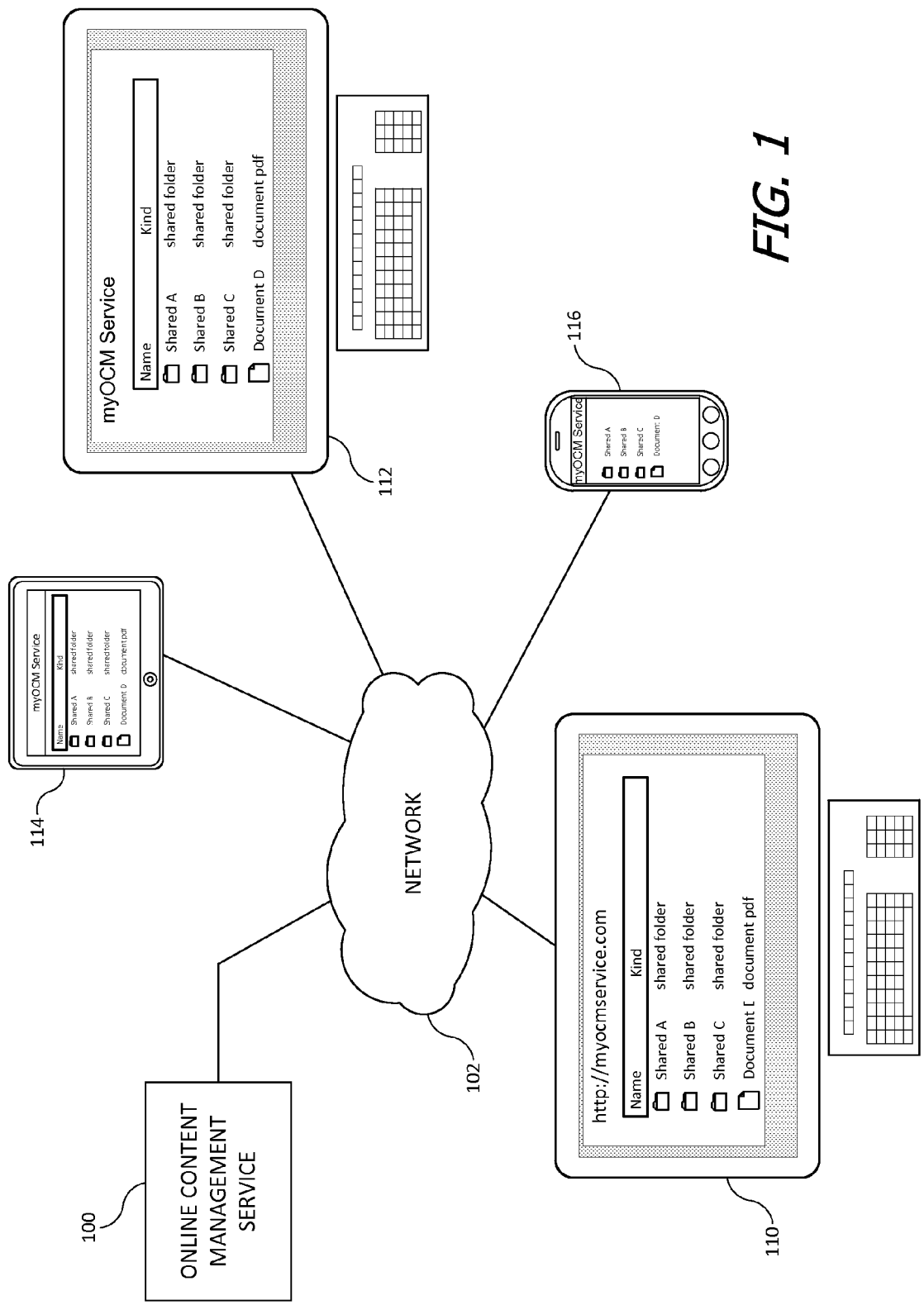
FIG. 1 shows clients accessing an online content management service according to an embodiment of the present invention.

Online content management services can enable users to access their content items from any internet-connected device. As described above, these services enable users to organize their content by folder, much like traditional file systems. To that end, relatively simple management techniques can be provided to organize and navigate a user's content. However, these services can also enable users to share their content with other users and groups of users. This adds an additional organizational dimension which demands its own management techniques to enable users to quickly and effectively manage their shared and unshared content. Existing content management techniques are inadequate when applied to shared content. For example, using existing techniques a user can identify content items stored in a particular location or having a particular name. However, with shared content, content management becomes more complex. A user may attempt to identify all content items shared with a friend, or shared with a project team from work. The content items which match this criteria can be spread across the content management service among the user's content items. Not only does this complicate the identification of shared content in a useful way, but by extension also complicates changing how and/or with whom the content items are shared. As users increasingly rely on these services to store and share their content, demand increases for more effective management techniques that enable shared content to be easily identified, viewed, and otherwise managed.

Certain embodiments of the present invention relate to dynamically organizing content items stored in an online content management service based on sharing profiles associated with the content items (including but not limited to text documents; email messages; text messages; other types of messages; media files such as photos, videos, and audio files; and/or folders containing multiple files). Each sharing profile includes content item-specific metadata, such as identifiers for who the content item is shared with, and any sharing restrictions that are associated with the sharing profile. Using the metadata stored in the sharing profiles, a content management service can enable the user to selectively view shared content items and sort the content items based on the metadata in the sharing profiles. Content items can be shared through the online content management service to other users and/or groups. Sharing can be effected by creating a shareable link for a content item, creating a shared folder, or directly sharing a document.

In some embodiments a sharing summary for a content item can be displayed using metadata stored in its sharing profile. A user can make changes to the sharing summary and those changes can be dynamically reflected in the sharing profile. In response to a request to view content items, the online content management service can automatically analyze the sharing profiles of the content items and organize content items into shared folders based on who the content items are shared with. A user can manually organize shared items by joining content items, such as by adding a content item to a folder or dragging two documents together in a user interface. Based on the joining, the users and/or groups with which each content item is shared can be reconciled, and each content item's sharing profile can be updated accordingly.

FIG. 1 shows clients accessing online content management service 100 according to an embodiment of the present invention. Online content management service 100 can include, for example, a file storage service, a file sharing service, a social media service that allows users to post messages and/or other content, and so on. Online content management service 100 can be hosted on servers maintained by a service provider and accessed via network 102, such as the Internet.

Users can access online content management service 100 by operating various clients 110, 112, 114, 116. As used herein, a "client" refers generally to a combination of computer hardware and software that enables a user to interact with online content management service 100. For example, client 110 can be a desktop or laptop computer executing a web browser (for example, Internet Explorer, Google Chrome, or Safari) that communicates with online content management service 100 using web protocols such as HTTP (Hypertext Transfer Protocol). Client 112 can be a desktop or laptop computer executing an application program provided by the provider of online content management service 100. In some instances where the online content management service provides access to files, the application program can allow files hosted on a server to appear to exist within a filesystem structure associated with the client computer's operating system. It should be noted that in some instances the same client computer can execute both a web browser and a desktop application program; accordingly, it is to be understood that a single physical device can implement one or more clients.

Other examples of clients include mobile devices, for example, tablet computer 114 and mobile phone 116, which can execute application programs (also referred to as "apps") that communicate with online content management service 100. At various times, a user can be interacting with one or more of clients 110, 112, 114, 116.

In some embodiments, online content management service 100 can allow users to selectively share content items stored in online content management service 100 with other users, including members and non-members of online content management service 100. Sharing content items (including but not limited to text documents; email messages; text messages; other types of messages; media files such as photos, videos, and audio files; and/or folders containing multiple files) can be effected in several ways. For example, a user can select a content item and specify one or more sharing permissions. As another example, a user can create a shared folder that includes one or more content items, including nested folders and files. Sharing permissions specified for the shared folder can be extended to each content item stored within the shared folder.

As yet another example, content items can be shared by creating shareable links. A user can select a content item and create a shareable link for that content item. The shareable link can then be shared through various communication media, such as instant message, email, SMS, and other similar channels. Each content item is therefore shared with whomever is given the shareable link. In some embodiments, the online content management service can include an interface for sending shareable links for content items. A user can provide user identifiers corresponding to those persons to whom the shareable link is to be sent. The user identifiers can include email addresses, membership identifiers associated with the online content management service, or other similar identifiers. A shareable link can link to a discrete content item or to a folder. In the latter case, a user following the shareable link can access any content items within the folder.

Some embodiments support sharing of content items with groups of users in addition to individual users. For example, members of a team can share content items, such as through a shared team folder, to more easily collaborate on team-related content items. Each group identifier can correspond to several user identifiers and the online content management service can maintain a mapping of each group identifier to its constituent user identifiers. When a content item is shared with one or more group identifiers, the group identifier mapping can be used to identify the user identifiers with which the content item is shared. Changes to the membership of a group can be effected by updating the group mapping.

Figure 2:
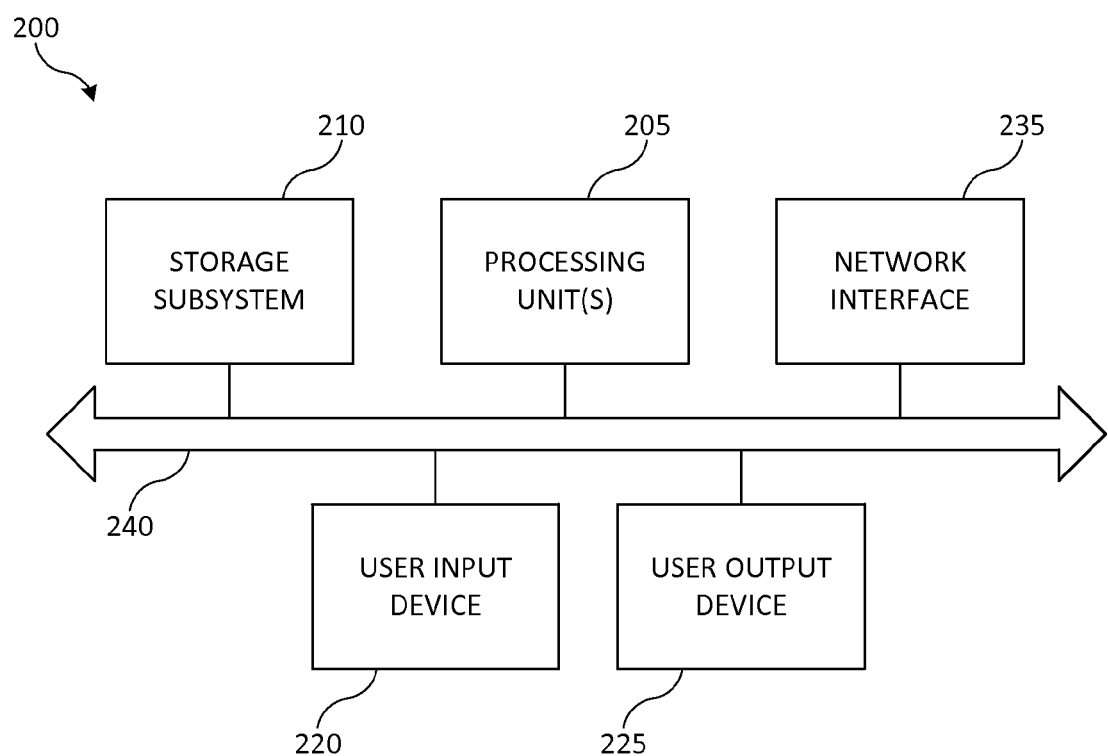
FIG. 2 shows a simplified block diagram of a representative computer system.

Various operations described herein can be implemented on computer systems, which can be of generally conventional design. FIG. 2 is a simplified block diagram illustrating a representative computer system 200. In various embodiments, computer system 200 or similar systems can implement a client (for example, any of platforms 110, 112, 114, 116) or a server (for example, server 200).

Computer system 200 can include processing unit(s) 205, storage subsystem 210, input devices 220, output devices 225, network interface 235, and bus 240.

Processing unit(s) 205 can include a single processor, which can have one or more cores, or multiple processors. In some embodiments, processing unit(s) 205 can include a general-purpose primary processor as well as one or more special-purpose co-processors such as graphics processors, digital signal processors, or the like. In some embodiments, some or all processing units 205 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 205 can execute instructions stored in storage subsystem 210.

Storage subsystem 210 can include various memory units such as a system memory, a read-only memory (ROM), and a permanent storage device. The ROM can store static data and instructions that are needed by processing unit(s) 205 and other modules of electronic device 200. The permanent storage device can be a read-and-write memory device. This permanent storage device can be a non-volatile memory unit that stores instructions and data even when computer system 200 is powered down. Some embodiments of the invention can use a mass-storage device (such as a magnetic or optical disk or flash memory) as a permanent storage device. Other embodiments can use a removable storage device (for example, a floppy disk, a flash drive) as a permanent storage device. The system memory can be a read-and-write memory device or a volatile read-and-write memory, such as dynamic random access memory. The system memory can store some or all of the instructions and data that processing unit(s) 205 need at runtime.

Storage subsystem 210 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 110 can include removable storage media that can be readable and/or writeable; examples of such media include compact disc (CD), read-only digital versatile disc (for example, DVD-ROM, dual-layer DVD-ROM), read-only and recordable Blue-Ray® disks, ultra density optical disks, flash memory cards (for example, SD cards, mini-SD cards, micro-SD cards, etc.), magnetic "floppy" disks, and so on. The computer readable storage media do not include carrier waves and transitory electronic signals passing wirelessly or over wired connections.

In some embodiments, storage subsystem 210 can store one or more software programs to be executed by processing unit(s) 205, such as an operating system, a browser application, a mobile app for accessing an online content management service, a desktop application for accessing the online content management service, and so on. "Software" refers generally to sequences of instructions that, when executed by processing unit(s) 205 cause computer system 200 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 205. Software can be implemented as a single program or a collection of separate programs or program modules that interact as desired. From storage subsystem 210, processing unit(s) 205 can retrieve program instructions to execute and data to process in order to execute various operations described herein.

A user interface can be provided by one or more user input devices 220 and one or more user output devices 225. Input devices 220 can include any device via which a user can provide signals to computing system 200; computing system 200 can interpret the signals as indicative of particular user requests or information. In various embodiments, input devices 220 can include any or all of a keyboard, touch pad, touch screen, mouse or other pointing device, scroll wheel, click wheel, dial, button, switch, keypad, microphone, and so on.

User output devices 225 can include any device via which computer system 200 can provide information to a user. For example, user output devices 225 can include a display to display images generated by computing system 200. The display can incorporate various image generation technologies, for example, a liquid crystal display (LCD), light-emitting diode (LED) including organic light-emitting diodes (OLED), projection system, cathode ray tube (CRT), or the like, together with supporting electronics (for example, digital-to-analog or analog-to-digital converters, signal processors, or the like). Some embodiments can include a device such as a touchscreen that function as both input and output device. In some embodiments, other user output devices 225 can be provided in addition to or instead of a display. Examples include indicator lights, speakers, tactile "display" devices, printers, and so on.

Network interface 235 can provide voice and/or data communication capability for computer system 200. In some embodiments, network interface 235 can include radio frequency (RF) transceiver components for accessing wireless voice and/or data networks (for example, using cellular telephone technology, advanced data network technology such as 3G, 4G or EDGE, WiFi (IEEE 802.11 family standards), or other mobile communication technologies, or any combination thereof), GPS receiver components, and/or other components. In some embodiments, network interface 235 can provide wired network connectivity (for example, Ethernet) in addition to or instead of a wireless interface. Network interface 235 can be implemented using a combination of hardware (for example, antennas, modulators/demodulators, encoders/decoders, and other analog and/or digital signal processing circuits) and software components.

Bus 240 can include various system, peripheral, and chipset buses that communicatively connect the numerous components of computing system 200. For example, bus 240 can communicatively couple processing unit(s) 205 with storage subsystem 210. Bus 240 can also connect to input devices 220 and output devices 225. Bus 240 can also couple computing system 200 to a network through network interface 235. In this manner, computing system 200 can be a part of a network of multiple computer systems (for example, a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 205 can provide various functionality for computing device 200. For example, in a mobile computing device, processing unit(s) 205 can execute an operating system and an app to communicate with online content management service 100. In a desktop computing device, processing unit(s) 205 can execute an operating system and a desktop application program that presents an interface to online content management service 100; in some embodiments, this interface can be integrated with an interface to a filesystem maintained by the operating system. In some embodiments, processing unit(s) 205 can execute a browser application that provides the ability to retrieve and display content items from sources such as online content management service 100 (for example, using HTTP or other data transfer protocols to retrieve and display web pages) and the ability to receive and interpret user input pertaining to the content items, such as selection of an item to view, submission of data by the user in response to a particular content item (for example, filling out a form on an interactive web page), and so on.

It will be appreciated that computer system 200 is illustrative and that variations and modifications are possible. Computer system 200 can have other capabilities not specifically described here (for example, mobile phone, global positioning system (GPS), power management, one or more cameras, various connection ports for connecting external devices or accessories, etc.). Further, while computer system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, for example, by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As described above, the ability to share content items stored in an online content management service can lead to more complex content management challenges. To address these challenges, and enable users to view, organize, and otherwise manage their content items, sharing-specific details for content items can be maintained in sharing profiles. FIG. 3 shows a sharing profile, in accordance with an embodiment of the present invention. As noted above, each content item stored in online content management service 100 can be associated with a sharing profile that includes sharing-specific metadata about its associated content item. Content management service 100 can store the sharing profiles and automatically update each sharing profile as changes are made by a user and/or based on activity on an associated content item, as described further below. For example, as shown in FIG. 3, sharing profile 300 can include sharing status field 302 which indicates whether the content item is shared. In some embodiments, sharing status field 302 can include a boolean value which represents the item's state as either shared or not shared. The sharing profile can include additional sharing metadata such as sharing mode field 304, indicating how an item is shared, and sharing target field 306, indicating with whom an item is shared.

As described above, content items can be shared in several modes such as by shareable link, shared folder, or directly shared by changing the sharing permissions for a particular content item. As shown in FIG. 3, sharing mode field 304 can include a value which represents how the content item is shared. In some embodiments, if a content item has been shared using more than one mode, sharing mode field 304 can include multiple values corresponding to each sharing mode. Alternatively, sharing mode field 304 can include a value corresponding to the particular combination of sharing modes used to share the content item.

In some embodiments, sharing target field 306 can include one or more target identifiers. As used herein, a target identifier refers to an identifier associated with the user and/or group which is the target of the sharing. A target identifier can be a user identifier or a group identifier. Sharing target field 306 can include a list of one or more target identifiers, an object or other data structure which includes the one or more target identifiers, a pointer to an object or other data structure which includes the one or more target identifiers, or other indication of the one or more target identifiers.

In some embodiments, the sharing profile can include any sharing restrictions associated with the content item. For example, temporal restriction field 308 can indicate a time-based limitation on the sharing of the content item. Such a time-based limitation can include a date and time when the content item will become shared, unshared, or a time period during which the content item will be shared. When a request is received to download a shared content item, the online content management service can determine whether the shared content item's sharing profile includes a temporal restriction and disallow the request if the temporal restriction is not met. In some embodiments, if the temporal restriction has expired, the online content management service can unshare the content item, such as by disabling a shared link or updating the sharing status of the content item to indicate the content item is not shared.

In some embodiments, geographic restriction field 310 can indicate one or more geographic regions within which the content item can be shared. For example, content items can be shared with a particular region, such as a particular country, state, or other political subdivision. Alternatively, content items can be excluded from being shared with a particular region. Geographic restriction field 310 can include geographic identifiers corresponding to those regions where the content item can be shared or those regions where the content item cannot be shared. In some embodiments, when a request is received to download a shared content item, the online content management service can determine a location associated with the request, for example, based on an IP address associated with the request, and compare the request location with any locations included in geographic restriction field 310. The online content management service can disallow the request if the geographic restriction is not met.

In some embodiments, the sharing profile can include download restriction field 312 which can define how many times the content item can be downloaded. For example, download restriction field 312 can include a count, specified by the sharer of the content item or set by default. In some embodiments, each time a request to download a shared content item is received, the online content management service can determine if a download restriction is associated with the shared content item. If a download restriction is set, the online content management service can determine whether downloads are still available for the content item. If it is determined that downloads are still available, the online content management service can allow the request and decrement the download count. If the download count has reached zero, the online content management service can deny the request. In some embodiments, when it is determined that the download count has reached zero, the online content management service can unshare the content item, such as by disabling a shared link or updating the sharing status of the content item to indicate the content item is not shared.

In some embodiments, each client device can store copies of sharing profiles associated with a user's content items. A client device can retrieve updated sharing profiles at default time intervals. In some embodiments, users can define update intervals for sharing profiles. The user defined update intervals can be defined globally for all sharing profiles or can be defined for each content item. In some embodiments, online content management service 100 can push updated sharing profiles to a client device when changes are made to the sharing profiles.

Figure 4:
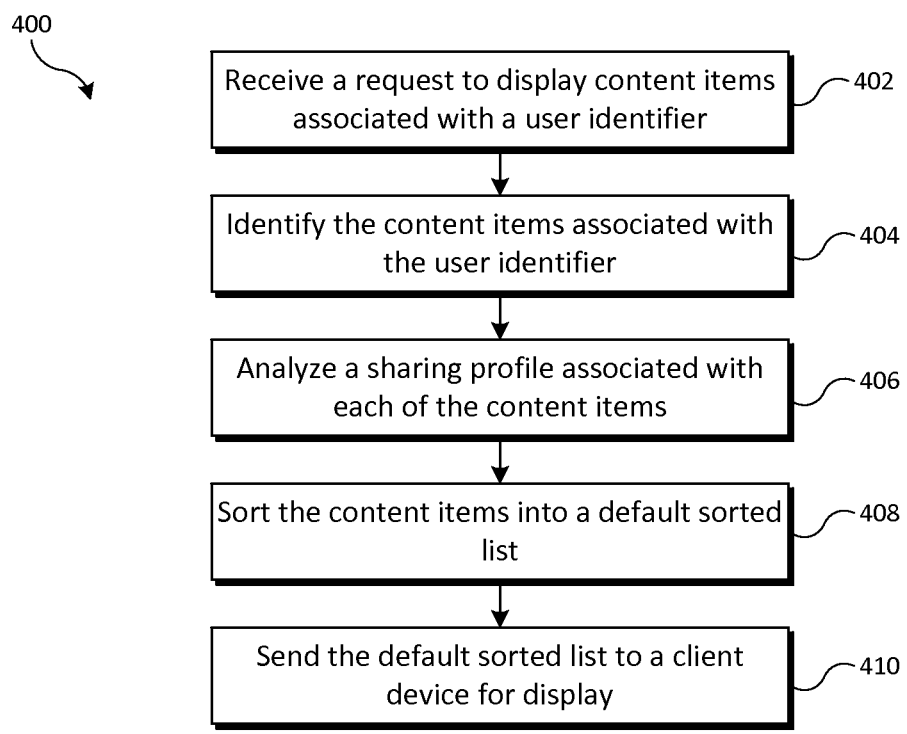
FIG. 4 shows a flow diagram of a process of organizing content items stored in an online content management service using sharing profiles, in accordance with an embodiment of the present invention.

Online content management service 100 can use the sharing-specific metadata stored in each content item's sharing profile to provide the user with the ability to organize and view their content items based on the sharing-specific metadata. FIG. 4 shows a flow diagram of process 400 for organizing content items stored in an online content management service using sharing profiles, in accordance with an embodiment of the present invention. Process 400 can be implemented, for example, on online content management service 100.

At block 402, online content management service 100 can receive a request from a client device to display content items associated with a user identifier. For example, when a user logs in to online content management service 100 from a computer, mobile device, or other client device using the user identifier, and requests to view content items. At block 404, online content management service 100 can identify content items stored with the online content management service which are associated with the user identifier.

As described above, each content item stored in online content management service 100 can be associated with a sharing profile that includes sharing metadata about its associated content item. At block 406, online content management service 100 can analyze the sharing profiles associated with the content items, for example to determine which content items are shared, with whom the content items are shared, and/or to determine other metadata stored in the sharing profiles. At block 408, online content management service 100 can sort the content items into a default, or any other predefined, sorted list. For example, the sorted list can be sorted according to whether a content item is shared, or based on content item sharing restrictions. In some embodiments, other content item metadata can be used to sort the list, such as content item name, kind, or modified date. At block 410, the sorted list can be sent to the client device to be displayed. In some embodiments, each content item in the sorted list can be displayed with an indication of whether the content item is shared, based on the analysis of the sharing profiles.

In some embodiments, online content management service 100 can return the sharing profiles associated with the content items to the client device, and the client device can analyze each sharing profile, and sort the content items into a default, or any other predefined, sorted list. This reduces processing by online content management service 100 and takes advantage of processing resources at the client device. The client device can display the default sorted list to the user on a display connected to the client device. If the user requests to re-sort the content, for example by selecting a particular field on the display, the client device can re-analyze the sharing profiles, re-sort the content items into a re-sorted list, and display the re-sorted list. In some embodiments, when the user requests to re-sort the content items, the client device can automatically request any updated sharing profiles from online content management service 100. For example the client device can send a time/date stamp associated with each sharing profile and online content management service 100 can compare the time/date stamps from the client device, to time/date stamps associated with the sharing profiles stored at online content management service 100. Online content management service 100 can return updated sharing profiles or a message indicating that all sharing profiles are up to date.

Figure 5A:
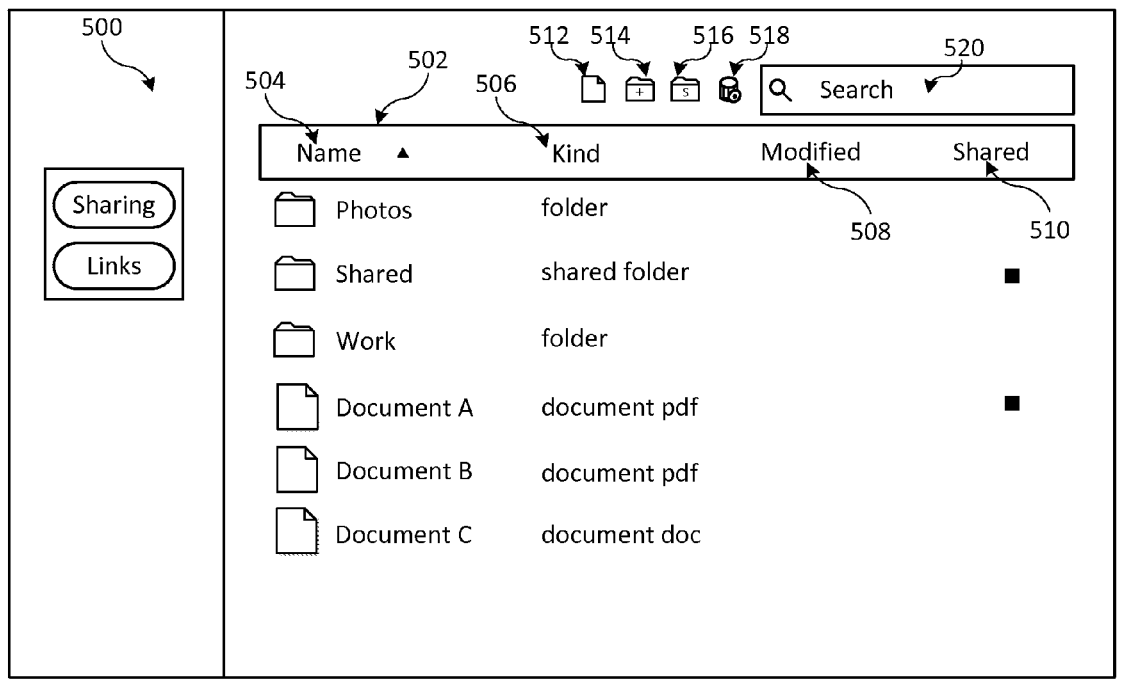
FIGS. 5A and 5B show exemplary user interfaces for displaying content items stored in an online content management service, in accordance with an embodiment of the present invention.
Figure 5B:
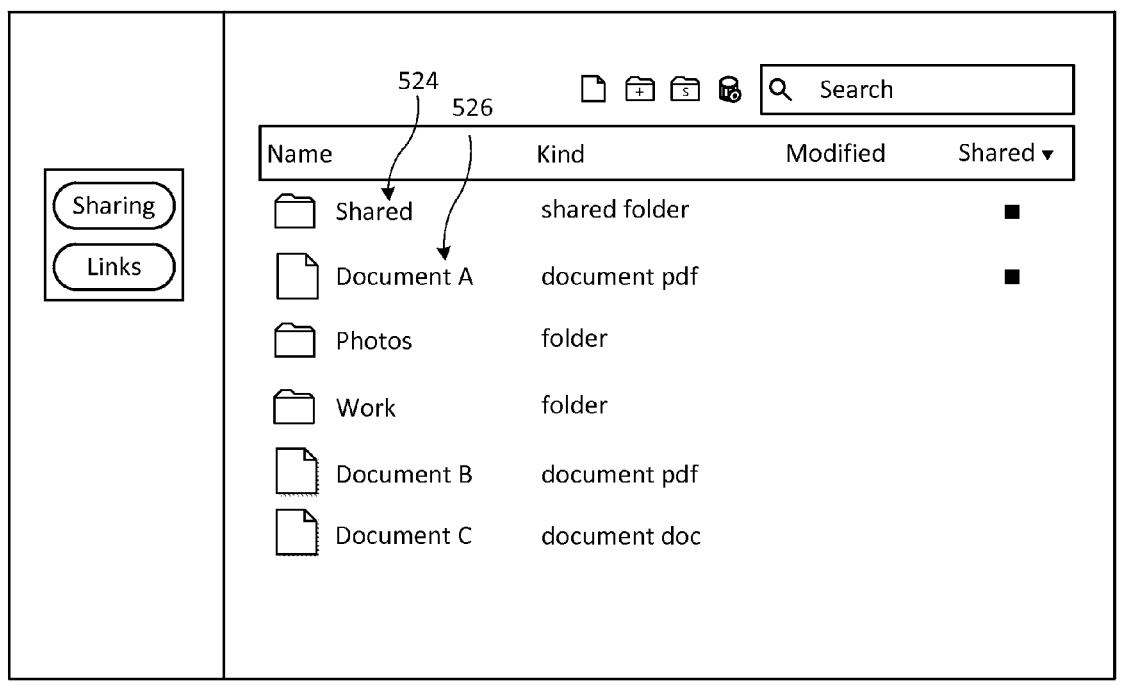

Using the sharing-specific metadata stored in the sharing profiles described above, online content management service 100 can incorporate sharing-based content management features into a user interface, providing users with simple and intuitive access to the sharing-based management features. FIGS. 5A and 5B show exemplary user interfaces for displaying content items stored in an online content management service, in accordance with an embodiment of the present invention. As shown in FIG. 5A, user interface 500 can be displayed on a client device and used to navigate and manage content items stored in online content management service 100. The user interface can display the user's content as shown at 502, sorted according to one or more characteristics of the content items. For example, as shown in FIG. 5A, folders and files are organized separately and are sorted by name 504. Alternatively, the content items can be sorted by kind 506, when they were last modified 508, or whether they are shared 510. Each characteristic can be determined based on a content item's metadata. For example, to determine which content items are shared, the online content management system can analyze each content item's sharing profile. User interface 500 can include selectable icons for uploading new content items 512, creating new folder 514, creating new shared folder 516, and deleting content items 518. User interface 500 can include a search bar 520 to limit or find specific subsets.

As shown in FIG. 5B, content items can be sorted according to sharing status, for example, based on user request. In some embodiments, the user can submit this request by selecting shared column 510. Online content management system 100 can then analyze the sharing profile of each content item, sort the content items to create a sorted list according to the content items' sharing status, and return the sorted list to the client device for display. As shown in FIG. 5B, Shared folder 524 and Document A 526, which were indicated as being shared, have been sorted to the top of the content items.

Figure 6:
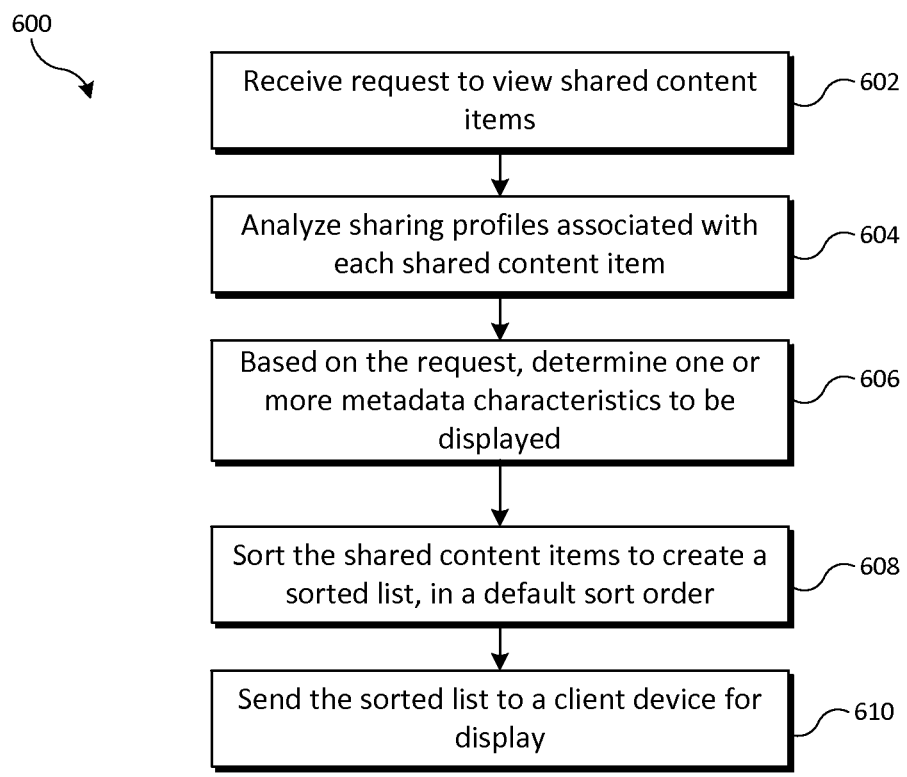
FIG. 6 shows a flow diagram of a process of organizing content items stored in an online content management service using sharing profiles, in accordance with an embodiment of the present invention.

As described above, a user can organize content items based on whether the content items are shared, providing a basic view of shared and unshared content items. However, each content item's sharing profile can include additional sharing-specific metadata such as sharing restrictions and sharing modes. Online content management service 100 can use the sharing profiles to provide more detailed views of a user's shared content items. FIG. 6 shows a flow diagram of a process 600 of organizing content items stored in an online content management service using sharing profiles, in accordance with an embodiment of the present invention. Process 600 can be implemented, for example, on online content management service 100.

At block 602, online content management service 100 can receive a request from a client device to display shared content items associated with a user identifier. For example, when a user logs in to online content management service 100 from a computer, mobile device, or other client device, that user can be shown, for example, all available content items associated with the user's identifier. The user can request to view shared content items, for example, by selecting a "sharing" icon. At block 604, online content management service 100 can analyze sharing profiles associated with each content item to determine which content items are shared. At block 606, based on the request and the analysis of the sharing profiles, online content management service 100 can determine one or more metadata characteristics from the sharing profiles to be displayed. At block 608, the shared content items can be sorted to create a sorted list. In some embodiments, a default sort order can be pre-defined, for example, by share type or share expiration. In some embodiments the default sort can be based on non-sharing metadata such as name or date modified. At block 610, the sorted list can be sent to the client device for display.

As described above, in some embodiments, each client device can store copies of the sharing profiles associated with the content items. This enables each client device to analyze the sharing profiles and sort and/or re-sort the content items based on requests from the user. This offloads processing from online content management service 100 to the client devices, taking advantage of processing resources at the client device and generally improving scalability.

Figure 7A:
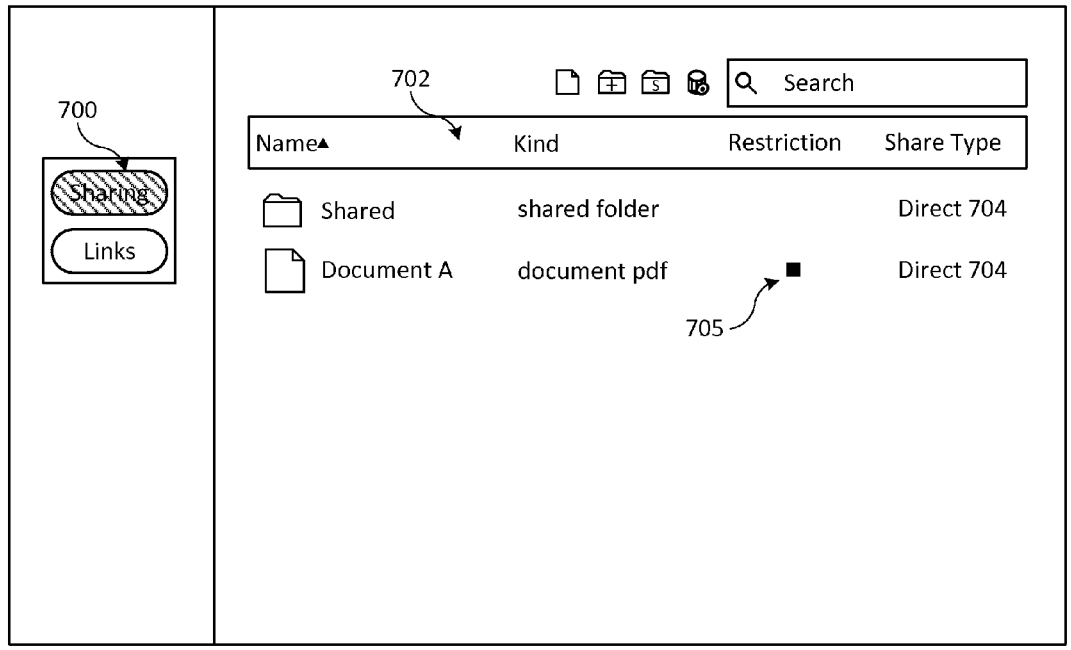
FIGS. 7A-7E show exemplary user interfaces for displaying content items stored in an online content management service, in accordance with an embodiment of the present invention.

Online content management service 100 can provide a user interface that incorporates access to the more detailed views of a user's shared content items, as described above. These views enable users to more quickly and efficiently manage their content. For example, the views can show shared content items which have a sharing restriction that is about to expire. The views can organize content items by the sharing entity with which they are shared. This enables the user to see what has been shared with whom and easily update how the content items are shared. FIGS. 7A-7E show exemplary user interfaces for displaying content items stored in an online content management service, in accordance with an embodiment of the present invention. As shown in FIG. 7A, a user can request to view shared content items, by selecting a sharing icon 700. The sortable characteristics 702 can be updated to include additional sharing-specific characteristics such as Restriction and Share Type. As described above, the share type can indicate by which method a content item is shared. For example, in FIG. 7A, both the folder Shared and Document A are directly shared 704. The user interface can indicate whether a sharing restriction is associated with any shared content items, as shown at 705.

Figure 7B:
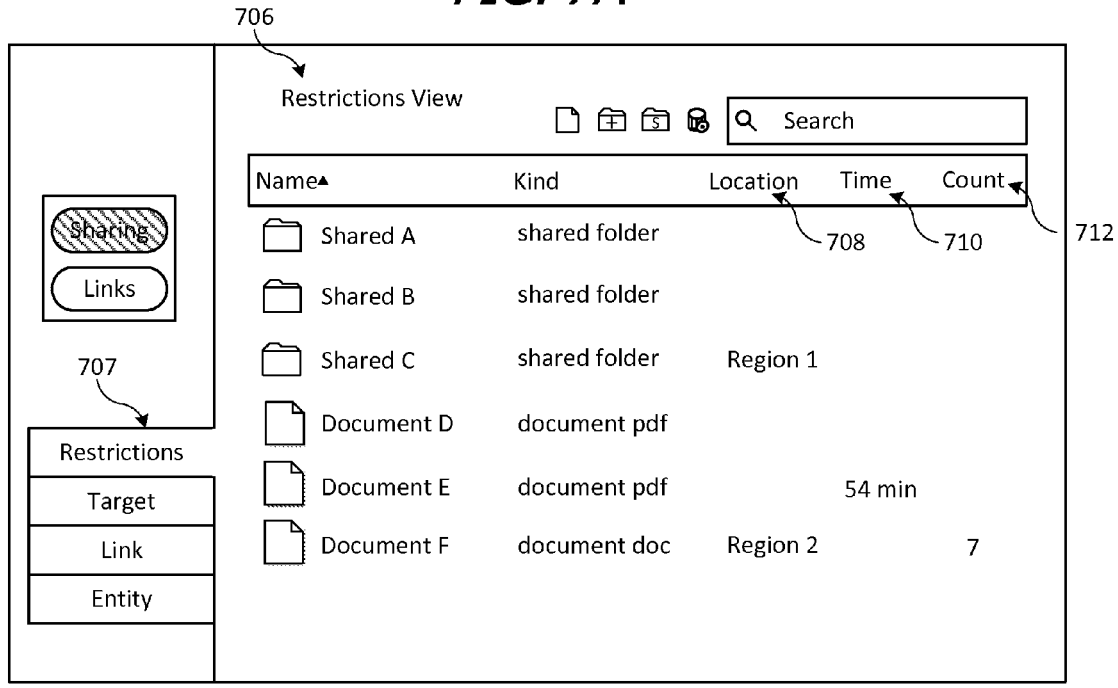

In some embodiments, a user can request different views of shared content items that provide different details of the shared content items. For example, different views can be represented as different tabs 707 in a user interface, and the user can request a particular view by selecting the corresponding tab. Alternative selection mechanisms are also possible, for example, by touching and dragging across a touchscreen interface, by selecting icons representing different views, and by other selection techniques. FIG. 7B shows an alternative view of shared content items. In Restrictions view 706, sharing restrictions associated with shared content items are shown as separate sortable characteristics. The added sortable characteristics include location 708, time 710, and count 712. As shown in FIG. 7B, the restrictions view can display all shared content items, not just those content items having a sharing profile associated with a restriction. Alternatively, the restrictions view can be limited to shared content items which have a restriction.

As described above, location restricted sharing can indicate a geographic area or other predefined region to which the content item can be shared. For example, as shown in FIG. 7B, Shared C is limited to Region 1. Time restricted sharing can set a predetermined period of time during which the item can be shared, such as Document E which is shown as having 54 minutes remaining during which it is shared. Download restricted sharing can set a predetermined number of available downloads for a content item before sharing is deactivated. As shown in FIG. 7B, Document F has seven downloads remaining. In some embodiments, restrictions view 706 can dynamically update the sharing restrictions as they change. For example, the time restriction on Document E can automatically update as the time counts down, and the download count for Document F can automatically decrement as download requests are received. Sorting by restriction enables users to quickly view which shared content items are soon to become unshared, for example which content items have a temporal restriction that is about to expire, or which content items are nearing their download limits. The user can use this information to decide whether to request changes to content item restrictions, such as extending temporal restrictions or increasing available downloads.

Figure 7C:
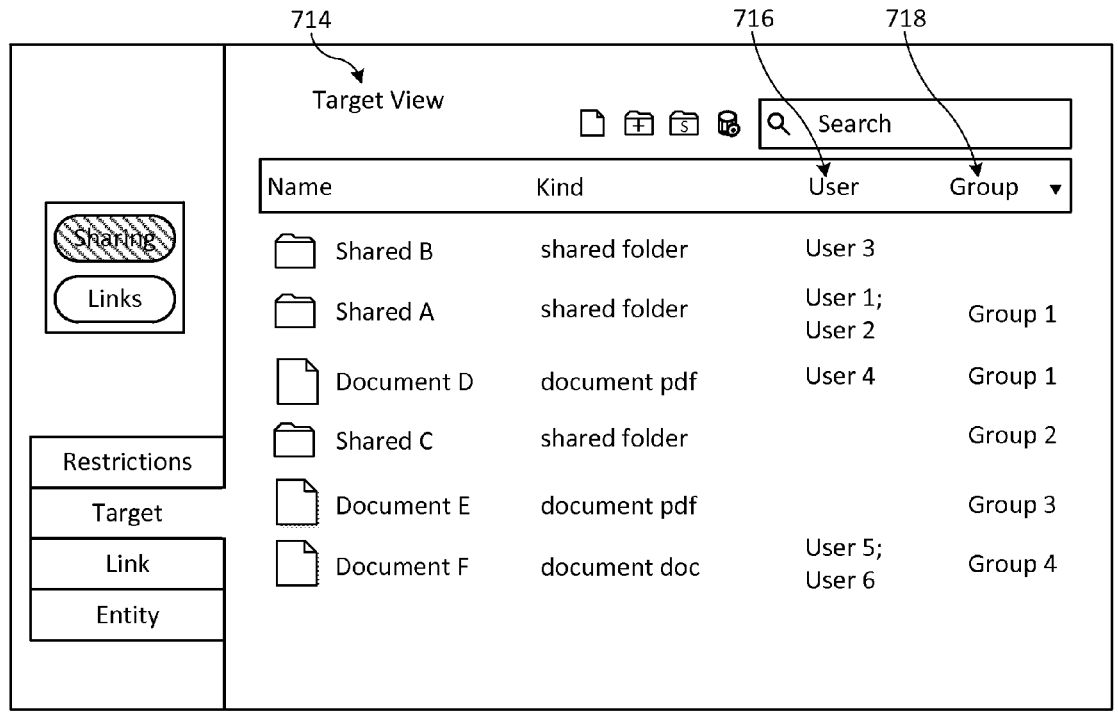

FIG. 7C shows target view 714 of shared content items. In target view 714, the target identifiers, including both user 716 and group identifiers 718, with which a content item is shared are shown as sortable characteristics. This enables users to quickly see which content items are shared with which users and groups, and sort the display of their shared content items accordingly. As shown in FIG. 7C, a content item can be associated with multiple target identifiers, including user identifiers and/or group identifiers. In some embodiments, target view 714 can display target identifiers for each user and/or group with which a content item has been separately shared. For example, folder Shared A has been shared with Group 1, User 1, and User 2. In this example, target identifiers included in Group 1 are not displayed. Alternatively, in some embodiments, target view 714 can display all user and/or group identifiers which have access to a content item, regardless of the sharing mode used to provide that access.

Figure 7D:
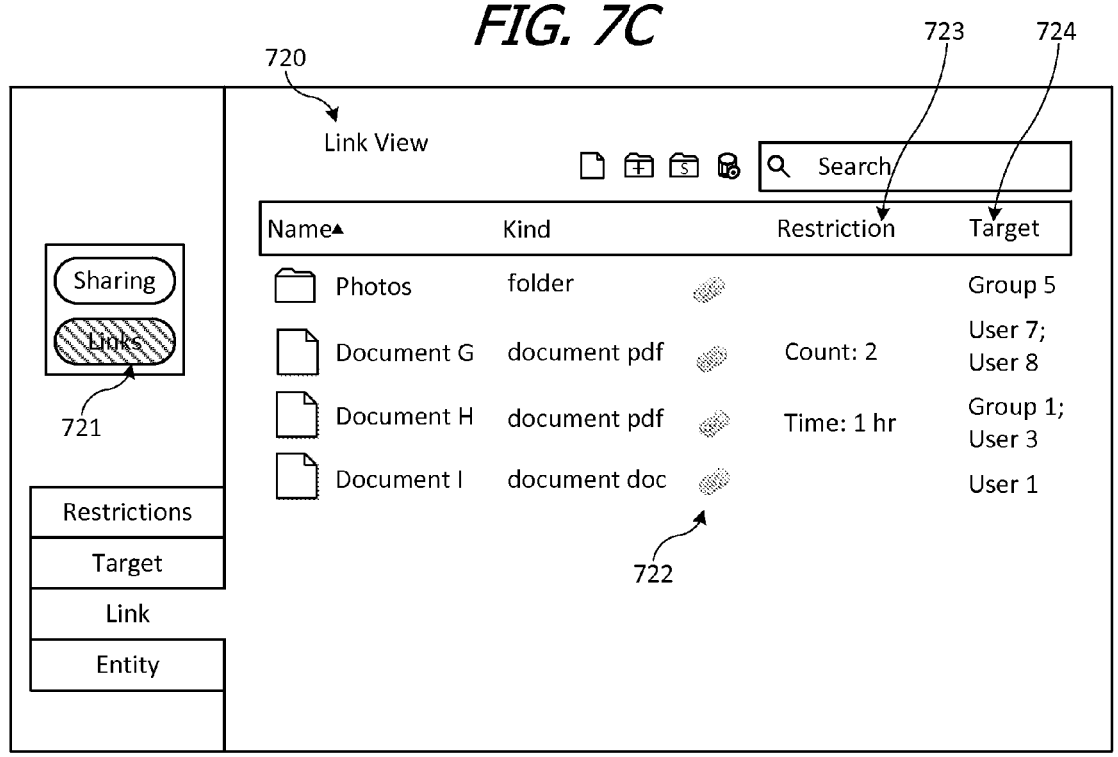

FIG. 7D shows link view 720 of shared content items. As shown in FIG. 7D, a user can request the link view by selecting links icon 721 or by selecting a Link tab. The link view 720 can include those content items for which shareable links have been created. In the link view 720, the user can request a copy of the shareable link for a content item by, for example, selecting a corresponding link icon 722. The copy of the shareable link can be displayed in a selectable format, such as a text field, and sent to other users and/or groups through a variety of messaging techniques. In some embodiments, restrictions 723 associated with a shareable link can be displayed along with known target identifiers 724 to which the shareable link was sent. In some embodiments, because shareable links can be sent through different communication mechanisms to both members and non-members of an online content management service, the shown target identifiers can represent an incomplete picture of the shareable link recipients. In some embodiments, as known members request the content item using the shareable link, the target identifiers associated with the shareable link can be updated.

Figure 7E:
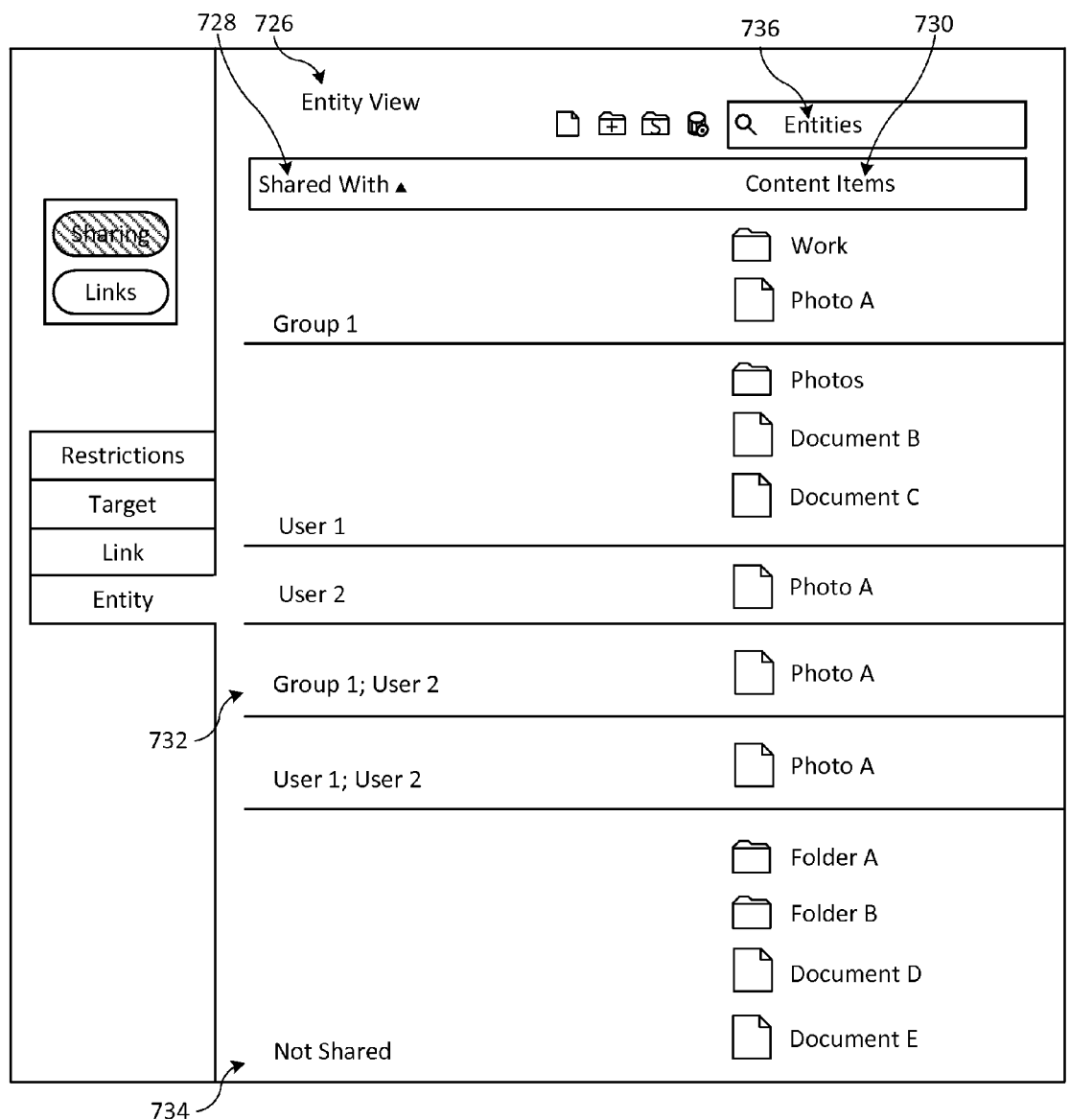

FIG. 7E shows entity view 726 of content items. As shown in FIG. 7E, entity view 726 provides a simplified view of content items 730 organized based on the sharing entity 728 with which they are shared. As used herein, the sharing entity can refer to the particular assortment of target identifiers, users and/or groups, with which a content item is shared. This view can show which content items are shared with a particular entity, without changing how or where the content items are stored within the file system. Entity view 726 can show which content items have been shared with each user and group, and can show which content items have been shared with different combinations of users and/or groups. For example, in FIG. 7E, the folder Work and image Photo A are shown as being shared with Group 1, and the folder Photos and Documents B and C are shown as being shared with User 1. In this example, Photo A is located in the Photos folder, and is therefore shared with User 1. As such, Photo A is shared with both Group 1 and User 1, as shown at 732. In some embodiments, as shown in FIG. E, entity view 726 can show the intersection of content items shared with a combination of users and/or groups. Alternatively, a view could be provided which shows the union of content items shared with a combination of users and/or groups.

In some embodiments, entity view 726 can display content items that have not been shared. As shown in FIG. 7E, Not Shared 734 can be displayed as the entity with which the unshared contents are associated. This way, entity view 726 can show a comprehensive view of all of a user's content items, rather than just shared content items. Within entity view 726, a user can change the entity with which a content item is shared by, for example, dragging and dropping the content item between entities. For example, to share Document B, which is currently shown as being shared with User 1, with another entity such as User 2, the user can select Document B and move it to User 2. Entity view 726 can then be updated to show Document B as being shared with both User 1 and User 2. The user can also share an unshared content item by, for example, dragging and dropping the unshared content item from Not Shared to the desired sharing entity. In that case, the unshared content item is no longer displayed under Not Shared and is instead displayed under the sharing entity with which it is now shared. Similarly, a shared content item can be unshared by, for example, dragging and dropping the shared content item from an entity with which the shared content item is shared, to Not Shared. In some embodiments, when moved to Not Shared, the shared content item can be unshared with all entities with which it was shared. As such, in entity view 726 the formerly shared content item is removed from any entities with which it was shared, and the formerly shared content item is displayed under Not Shared. Alternatively, in some embodiments, when moved to Not Shared, the shared content item is only unshared with the entity from which it was moved.

Through entity view 726, a user can select a sharing entity name to show only those content items shared with that sharing entity. For users having content items shared with many different sharing entities, or a large number of content items shared with a particular entity, this can provide an easier to manage view of content items shared with a particular sharing entity. In some embodiments, entity view 726 can include entities search bar 736. The user can use entities search bar 736 to limit the sharing entities shown in entity view 726 to a subset of sharing entities. In some embodiments, entity view 726 can show the user's user name as an entity. This enables the user to see those content items which have been shared with the user by different users. By selecting the user's user name, a more detailed view of the content items that have been shared with the user can be displayed, including details such as sharing restrictions.

Figure 8:
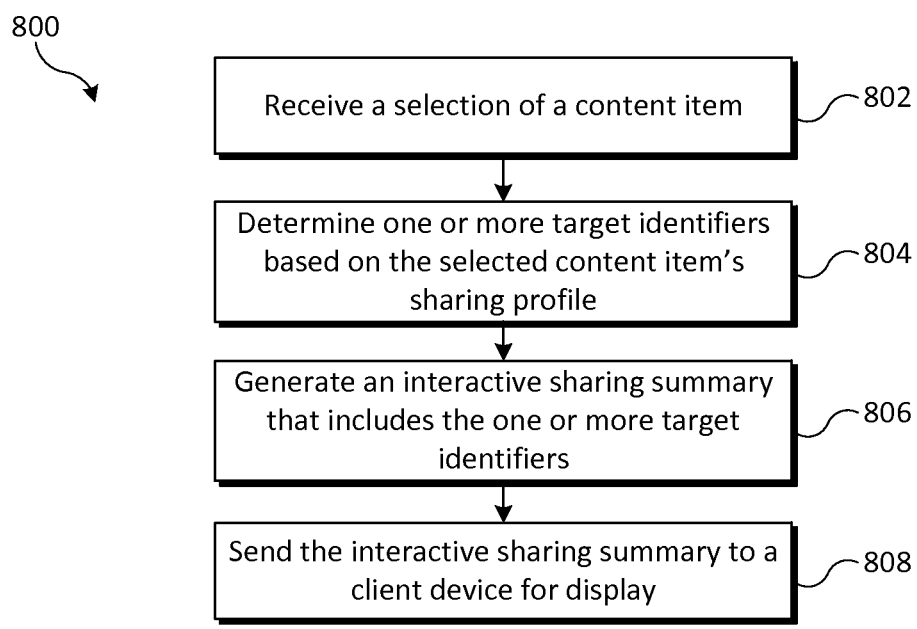
FIG. 8 shows a flow diagram of a process of generating an interactive sharing summary for a content item, in accordance with an embodiment of the present invention.

The above-described views of a user's content items enable the user to quickly and intuitively manage their content from a high level perspective. Sharing of content items can also be managed on a per content item basis, through an interactive sharing summary. FIG. 8 shows a flow diagram of a process 800 of generating an interactive sharing summary for a content item, in accordance with an embodiment of the present invention. Process 800 can be implemented, for example, on online content management service 100.

At block 802, online content management service 100 can receive a selection of a content item from a client device. For example, the user can make the selection through a user interface on a client device. At block 804, the selected content item's sharing profile can be analyzed to determine one or more target identifiers with which the content item is shared. In some embodiments, sharing restrictions can also be determined from the sharing profile. At block 806, an interactive sharing summary is generated. The interactive sharing summary can include the one or more target identifiers, and/or other information, such as any sharing restrictions associated with the content item. At block 808, the interactive sharing summary can be sent to the client device for display.

In some embodiments, online content management service 100 can return the sharing profile associated with the selected content item to the client device, and the client device can analyze the sharing profile to determine one or more target identifiers with which the content item is shared. The client device can generate the interactive sharing summary based on the analysis of the sharing profile and display the interactive sharing summary. Any changes made to the interactive sharing summary by the user, for example adding or removing target identifiers, can be automatically synchronized with the sharing profile associated with the selected content item stored at online content management service 100.

Figure 9:
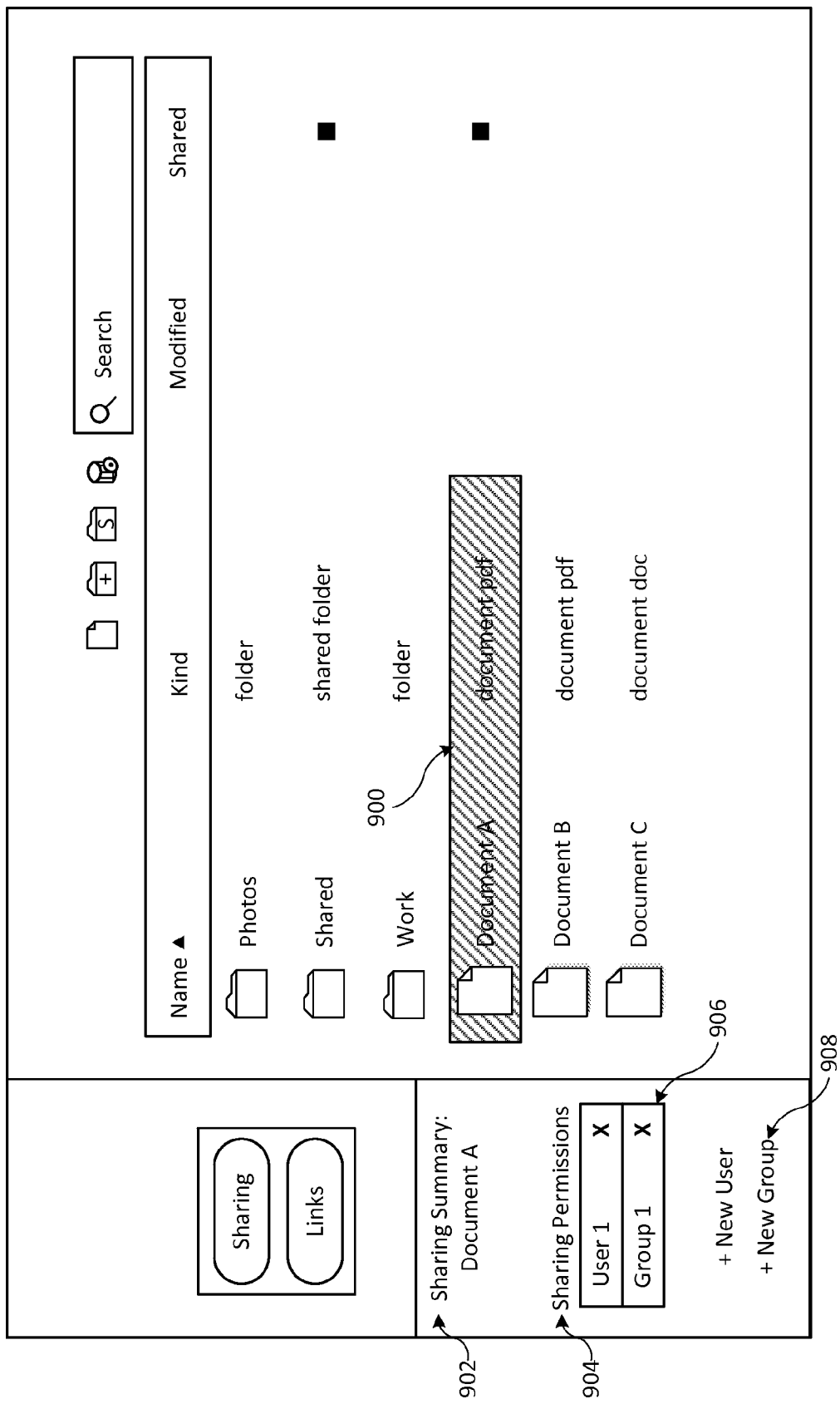
FIG. 9 shows an exemplary user interface including an interactive sharing summary for a selected content item stored in an online content management service, in accordance with an embodiment of the present invention.

FIG. 9 shows an exemplary user interface including an interactive sharing summary for a selected content item stored in an online content management service, in accordance with an embodiment of the present invention. As shown in FIG. 9, a user can select content item 900 displayed on a client device. Once content item 900 is selected, the online content management service can analyze a sharing profile associated with the content item to determine sharing information about the content item, such as target user identifiers with which the content item is shared and sharing restrictions. Using this information, the online content management service can generate interactive sharing summary 902 for the content item. The interactive sharing summary can include sharing permissions 904 that include target identifiers 906 with which the content item is shared. Each target identifier can be selected to dynamically modify the sharing permissions, such as to change a sharing restriction or unshare the content item with the target identifier. In some embodiments, interactive sharing summary 902 can enable a user to share the selected content item with additional target identifiers. For example, as shown at 908, interactive sharing summary 902 can include icons that when selected enable a user to share the content item with a new user or group identifier. In some embodiments, the interactive sharing summary can be displayed as a sidebar (as shown), a pop-up window, overlay, or other graphical representation and can vary depending on the client device in use.

Figure 10:
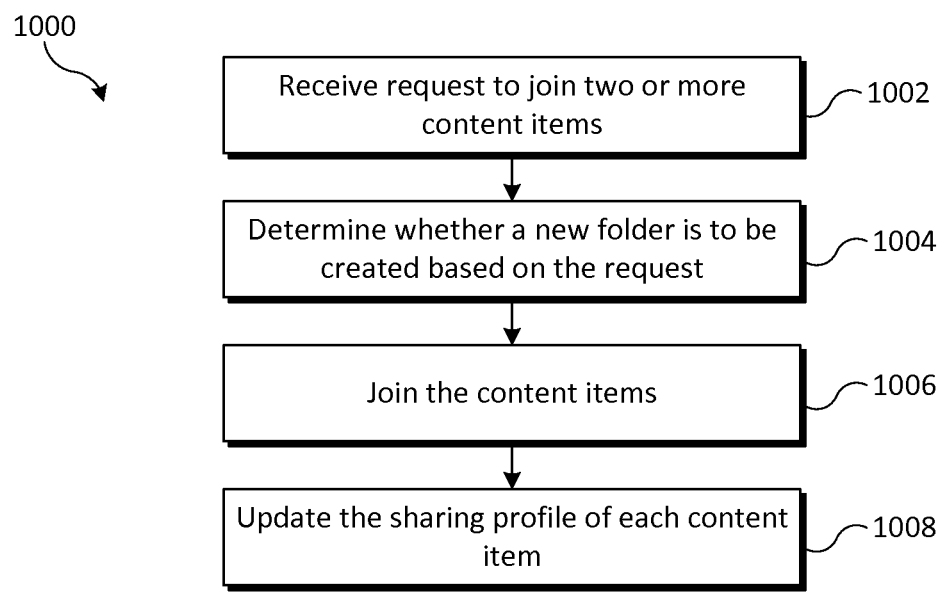
FIG. 10 shows a flow diagram of a process of joining content items stored in an online content management service, in accordance with an embodiment of the present invention.

As described above, an interactive sharing summary enables the user to view and edit sharing-specific metadata stored in a content item's sharing profile. This provides users with one way of managing sharing details for a given content item. Another method of managing sharing details for a content item is to join it with another content item, for example, by dragging and dropping one content item onto another in a user interface. FIG. 10 shows a flow diagram of a process 1000 of joining content items stored in an online content management service, in accordance with an embodiment of the present invention. Process 1000 can be implemented, for example, on online content management service 100.

At block 1002, online content management service 100 can receive a request from a client device to join two or more content items. For example, the user can select a first content item and drag and drop the first content item onto a second content item. At block 1004, the online content management service can determine whether to create a new folder based on the request. For example, if the user selects a document and requests to join the document with a folder, the online content management service can add the document to the folder without creating a new folder. Alternatively, if the user selects a first document and requests to join it with a second document, the online content management service can automatically create a new folder which includes the first and second documents. Similarly, if the user selects a first folder and requests to join it with a second folder, a new folder can automatically be created which includes the first and second folders as sub-folders. In some embodiments, when a user requests to join a folder content item and a non-folder content item, the user can be prompted to choose whether to create a new folder which includes both content items, or to add the non-folder content item to the folder content item. At block 1006, the content items are joined, which can include creating a new folder as described above.

At block 1008, the sharing profiles of the content items are updated. Each sharing profile can be updated depending on how the content items were joined and which users and/or groups the content items were shared with. If joining the content items results in a hierarchical relationship between the joined content items, the sharing permissions of the hierarchically superior content item can be copied by each hierarchically inferior content item. For example, if the joining of a document and a folder results in the document being stored in the folder, or if a joining of two folders results in one folder being nested within the other, the sharing permissions of the outermost folder can be adopted by the content items stored therein. If the joining results in a new folder which includes the joined content items, the sharing permissions of the joined content items can be reconciled, and the sharing profile of the new folder updated to match the reconciled permissions. In some embodiments, the reconciled permissions can represent a union of each content item's permissions. For example, if a first content item is shared with User 1 and a second content item is shared with User 2, the first and second content items can be joined in a new folder which includes the first and second content items and which is shared with Users 1 and 2. The sharing profiles of the new folder and the first and second content items can be updated to reflect the new sharing permissions. Alternatively, the reconciled permissions can represent the intersection of each content item's permissions, if the content items are shared with at least one common target user identifier. In some embodiments, the user can be prompted to manually reconcile the sharing permissions by defining the sharing permissions of the joined content items.

Figure 11A:
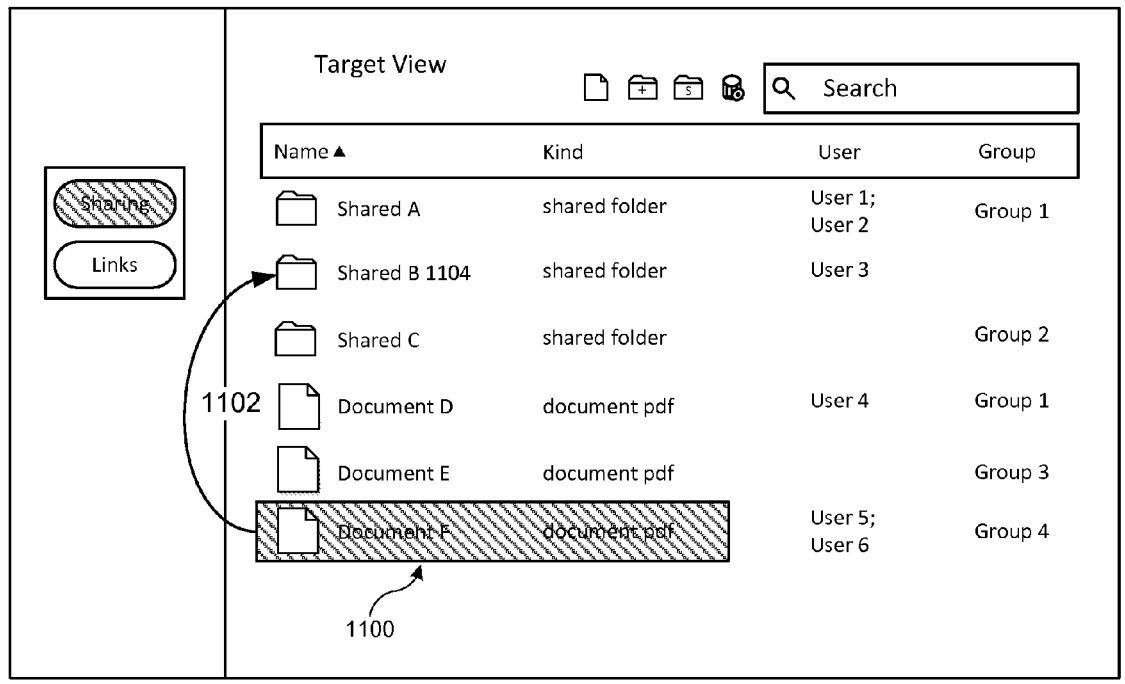
FIGS. 11A and 11B show an exemplary user interface which enables users to join content items stored in an online content management service, in accordance with an embodiment of the present invention.
Figure 11B:
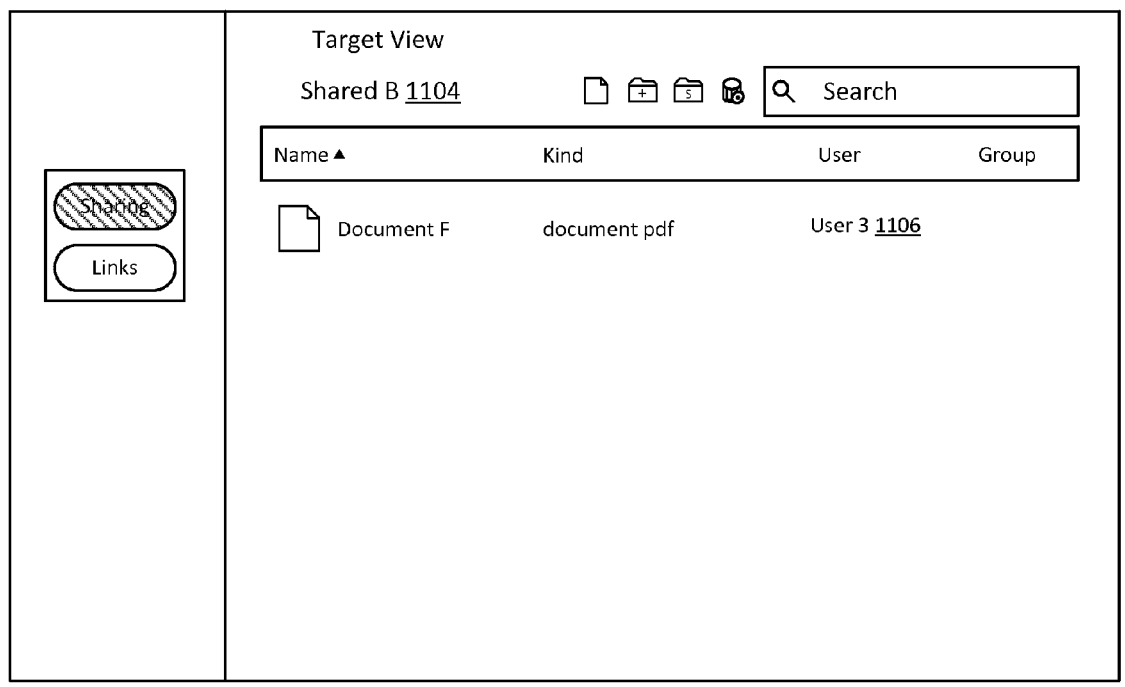

FIGS. 11A and 11B show an exemplary user interface which enables users to join content items stored in an online content management service, in accordance with an embodiment of the present invention. As shown in FIG. 11A, a user can select first content item 1100 displayed on a client device. Once selected, the user can request 1102 that the first content item be joined with a second content item 1104. For example, the user can drag and drop the first content item onto the second content item. As described above, the result of the joining can vary depending on the content items being joined. In the example shown in FIG. 11A, the first content item is a document, and the second content item is a folder. In this example, by joining the document and the folder, the document is added to the folder. In some embodiments, a new folder can be created as a result of the joining and/or a user can be prompted to determine whether to create a new folder.

FIG. 11B shows a view of the contents of folder Shared B 1104. As a result of the joining, Document F 1100 has been added to Shared B 1104. Once joined, the sharing permissions of the joined content items are reconciled. Previously, as shown in FIG. 11A, Document F was shared with Users 5 and 6 and Group 4, while Shared B was shared with User 3. Since Document F was added to Shared B, and is therefore hierarchically inferior, Document F's sharing profile is updated such that it is no longer shared with Users 5 and 6 and Group 4, and is instead shared with User 3 to match Shared B. In some embodiments, an unshared content item can be joined with a shared content item. In that case, the unshared content item is shared with the same target identifiers as the shared content item with which it was joined.

Figure 12:
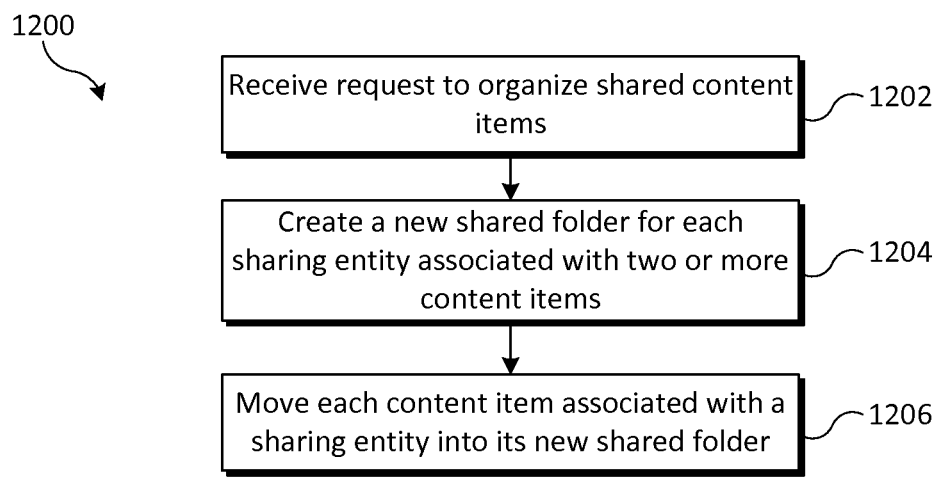
FIG. 12 shows a flow diagram of a process of automatically organizing content items stored in an online content management service, in accordance with an embodiment of the present invention.

As described above, online content management service 100 can provide various views of a user's content items sortable by sharing specific metadata stored in sharing profiles. These views do not alter the underlying file structure of the content management service. In some embodiments, online content management service 100 can enable users to re-sort their shared content based on the sharing specific metadata. FIG. 12 shows a flow diagram of a process 1200 of automatically organizing content items stored in an online content management service, in accordance with an embodiment of the present invention. Process 1200 can be implemented, for example, on online content management service 100.

At block 1202, online content management service 100 can receive a request from a client device to automatically organize shared content items stored in online content management service 100. For example, the user can select an "organize" icon displayed in a user interface on a client device. At block 1204, a new folder can be created for each sharing entity associated with two or more shared content items stored in the online content management service. As used herein, the sharing entity can refer to the particular assortment of target identifiers with which a content item is shared. For example, if a first content item is shared with User 1 and Group 2, the first content item's sharing entity is User 1 and Group 2. Online content management service 100 can identify each content item's sharing entity based on each content item's sharing profile. In some embodiments, online content management service 100 can iterate through each shared content item to determine how many sharing entities exist among the user's shared content, and to count how many content items are associated with each sharing entity. At block 1204, content items can automatically be moved to the appropriate new folder, based on their sharing entity.

Figure 13A:
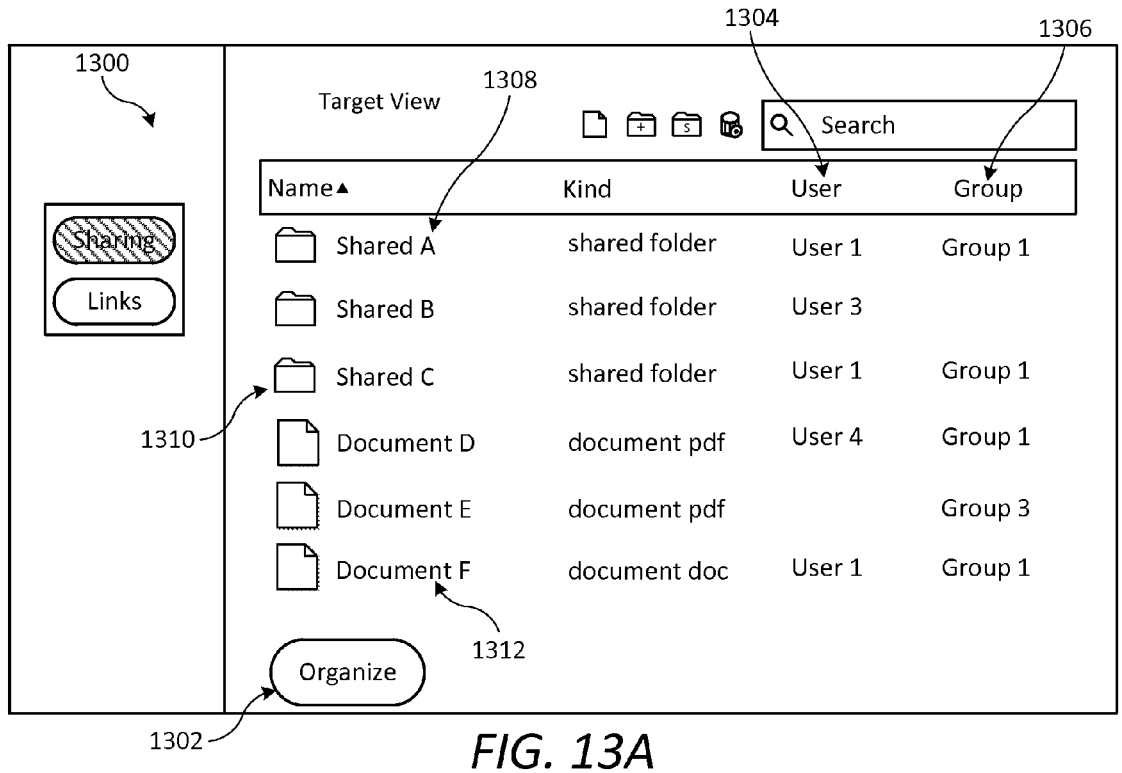
FIGS. 13A-13C show an exemplary user interface which enables users to request automatic organization of shared content items stored in an online content management service, in accordance with an embodiment of the present invention.
Figure 13B:
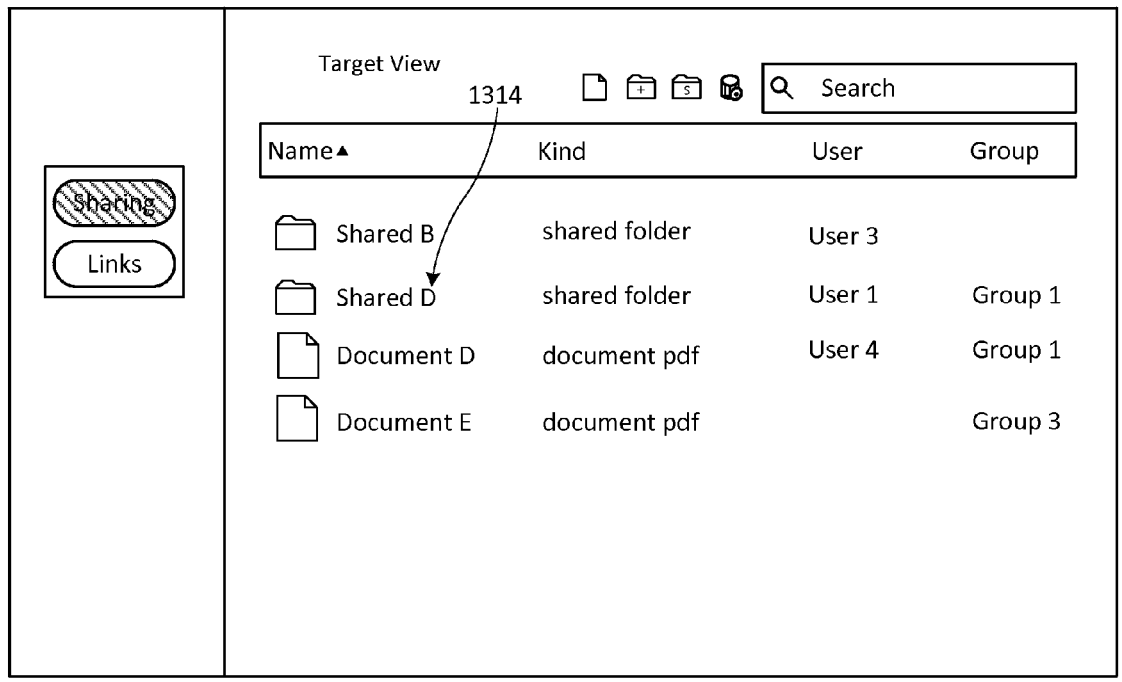
Figure 13C:
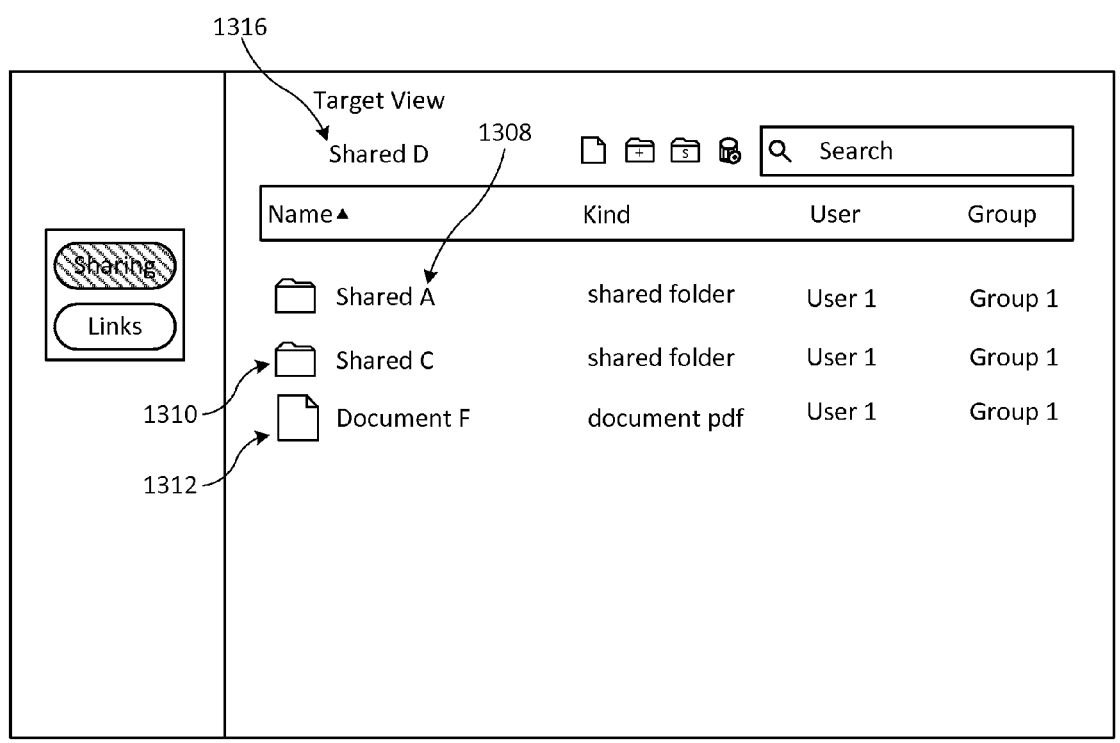

FIGS. 13A-13C show exemplary user interface 1300 which enables users to request automatic organization of shared content items stored in an online content management service, in accordance with an embodiment of the present invention. As shown in FIG. 13A, user interface 1300 can be operable to receive a request to automatically organize shared content items. For example, the interface can include selectable "organize" icon 1302. The interface can show each user 1304 and group 1306 with which each content item is shared. When a user requests that the shared content items be automatically organized, the online content management service can identify each content item's sharing entity based on each content item's sharing profile. The online content management service can also determine which sharing entities are associated with more than one content item. For example, in FIG. 13A, Shared A 1308, Shared C 1310, and Document F 1312 are each associated with the sharing entity User 1, Group 1.

In FIG. 13B, a new folder Shared D 1314 has been created for the sharing entity {User 1, Group 1}. The other identified sharing entities {User 3; User 4, Group 1; and Group 3} are each associated with a single content item, and therefore new folders for these sharing entities were not created. Each content item {Shared A 1308, Shared C 1310, and Document F 1312} associated with the sharing entity {User 1, Group 1}, has been moved to new folder Shared D 1314. FIG. 13C shows a view 1316 of the contents of Shared D which now includes content items Shared A 1308, Shared C 1310, and Document F 1312. By automatically organizing content items by sharing entity, the online content management service enables users to more easily make changes to the sharing permissions of all content items shared with a particular sharing entity and provides the user with a cleaner, more easily navigated view of the user's shared content items.

It will be appreciated that processes 400, 600, 800, 1000 and 1200 are illustrative and that variations and modifications are possible. Steps described as sequential can be executed in parallel, order of steps can be varied, and steps can be modified, joined, added or omitted. Used together, processes 400, 600, 800, 1000 and 1200 (or similar processes) can allow clients to organize and navigate content items, and modify sharing permissions of content items, using each content item's sharing profile.

While the invention has been described with respect to specific embodiments, one skilled in the art will recognize that numerous modifications are possible. For example, the particular events, data structures, and platforms described herein are used for purposes of illustration; other events, data structures, and platforms can be substituted. Techniques for selecting, requesting, and modifying organizational structures and sharing permissions can also be modified as appropriate for a particular client.

Embodiments described above can make reference to data structures and databases or data stores. It is to be understood that these terms can encompass any techniques for organizing information into discrete records that can be stored, retrieved and interpreted by computer systems.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, for example, by designing electronic circuits to perform the operation, by programming programmable electronic circuits (such as microprocessors) to perform the operation, or any combination thereof. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (for example, via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A non-transitory computer readable medium comprising instructions stored on the non-transitory computer readable medium that when executed by a server cause the server of an online content management system to:
send data to a client device, the data describing a first shared content item and a second shared content item, the first shared content item associated with a first target identifier, the second shared content item associated with a second target identifier;
receive a request to join the first shared content item with the second shared content item, wherein the request to join is a first join type that is one of a plurality of join types;
join the first shared content item with the second shared content item according to the join type:
wherein the first shared content item is a file and the second shared content item is a folder which constitutes the first join type, and the first join type includes combining the first shared content item into the second shared content item and associating the second target identifier associated with the second shared content item to the first shared content item; and
reconciling sharing permissions of the first and second shared content items by updating the data describing the first and second shared content items.

2. The non-transitory computer readable medium of claim 1, wherein the received request to join the first shared content item with the second shared content item is of a second join type, wherein the first shared content item is one of a file or folder and the second shared content item is the same as the first shared content item and the non-transitory computer readable medium comprises instructions that when executed are effective to cause the server of the online content management system to:
combine the first shared content item and the second shared content item into a common folder including both the first shared content item and the second shared content item, which constitutes the second join type,
associating the common folder with the first target identifier and the second target identifier.

3. The non-transitory computer readable medium of claim 1 comprising instructions that when executed are effective to cause the server of the online content management system to:
receive an instruction to automatically organize the first shared content item and the second shared content item, the instruction to automatically organize indicating a third join type, and the third join type includes:
automatically determine that the first target identifier and the second target identifier are the same,
create a new shared folder for each unique target identifier associated with two or more content items, wherein each new shared folder is associated with a respective unique target identifier, and
automatically join the first shared content item and the second shared content item into the new shared folder when the first shared content item and the second shared content item have the same target identifier as the new shared folder, which constitutes the third join type.

4. A method executable at a server, the method comprising:
receiving a request to join a first content item and a second content item stored in an online content management service;
determining whether a new shared folder is to be created based on the request, wherein determining includes:
not creating the new shared folder if one of the first and second content items is a file and the other content item is a folder;
moving the content item that is the file into the content item that is the folder, which constitutes a first join type from a plurality of join types, wherein an updated sharing profile of the content item that is the file matches the sharing profile of the folder;
joining the first and second content items, utilizing one of a plurality of join types; and
updating sharing profiles associated with the first and second content items based on the joining by reconciling permissions of the first and second content items.

5. The method of claim 4 wherein determining whether a new folder is to be created based on the request includes:
creating the new shared folder if the first and second content items are both files or both folders, which constitutes a second join type from the plurality of join types.

6. The method of claim 5 wherein the new shared folder is shared with a sharing profile including target identifiers corresponding to a union of target identifiers associated with the first content item and target identifiers associated with the second content item.

7. The method of claim 5 wherein the new shared folder is shared with a sharing profile including target identifiers corresponding to an intersection of target identifiers associated with the first content item and target identifiers associated with the second content item.

8. The method of claim 4 wherein updating a sharing profile associated with the first and second content items based on the joining includes:
determining a hierarchical relationship between the first and second content items; and
updating the sharing profile of an hierarchically inferior content item to match the sharing profile of an hierarchically superior content item.

9. The method of claim 4 wherein each sharing profile includes a plurality of fields, wherein the plurality of fields includes one or more of:
a sharing status field indicating whether the content item is shared;
a sharing mode field indicating how the content item is shared;
a sharing target field that includes one or more target identifiers corresponding to users or groups with which the content item is shared; or
a sharing restriction field indicating one or more sharing restrictions associated with the content item.

10. The method of claim 9 wherein the sharing mode field includes one or more of a reference to a shared link or a reference to a shared folder.

11. The method of claim 9 wherein the sharing restriction field comprises one or more of:
a temporal restriction field;
a download restriction field; or
a geographic restriction field.

12. A content management system storing a plurality of shared content items, the content management system comprising:
a computing device; and
a non-transitory computing device readable medium including instructions stored thereon, the instructions, when executed by the computing device being effective to cause the content management system to:
receive a request to join a first content item and a second content item stored in an online content management service;
determine whether a new shared folder is to be created based on the request, wherein determining includes:
not creating the new shared folder if one of the first and second content items is a file and the other content item is a folder;

moving the content item that is the file into the content item that is the folder, which constitutes a first join type from a plurality of join types, wherein an updated sharing profile of the content item that is the file matches the sharing profile of the folder;

join the first and second content items, utilizing one of a plurality of join types; and update sharing profiles associated with the first and second content items based on the joining to reconcile permissions of the first and second content items.

13. The content management system of claim 12 wherein determining whether a new folder is to be created based on the request includes:

creating the new shared folder if the first and second content items are both files or both folders, which constitutes a second join type from the plurality of join types.

14. The content management system of claim 13 wherein the new shared folder is shared with a sharing profile including target identifiers corresponding to a union of target identifiers associated with the first content item and target identifiers associated with the second content item.

15. The content management system of claim 13 wherein the new shared folder is shared with a sharing profile including target identifiers corresponding to an intersection of target identifiers associated with the first content item and target identifiers associated with the second content item.

16. The content management system of claim 12 wherein update sharing profiles associated with the first and second content items based on the joining includes:

determine a hierarchical relationship between the first and second content items; and update the sharing profile of an hierarchically inferior content item to match the sharing profile of an hierarchically superior content item.

17. The content management system of claim 12 wherein each sharing profile associated with a content item includes a plurality of fields, wherein the plurality of fields includes one or more of:

a sharing status field indicating whether the content item is shared;

a sharing mode field indicating how the content item is shared;

a sharing target field that includes one or more target identifiers corresponding to users or groups with which the content item is shared; or a sharing restriction field indicating one or more sharing restrictions associated with the content item.

18. The content management system of claim 17 wherein the sharing restriction field comprises one or more of:

a temporal restriction field;

a download restriction field; or a geographic restriction field.

* * * * *